United States Patent [19]

Kugimiya et al.

[11] Patent Number: 5,352,522
[45] Date of Patent: * Oct. 4, 1994

[54] COMPOSITE MATERIAL COMPRISING METALLIC ALLOY GRAINS COATED WITH A DIELECTRIC SUBSTANCE

[75] Inventors: Koichi Kugimiya; Yasuhiro Sugaya; Osamu Inoue; Mitsuo Satomi; Ken Hirota, all of Osaka, Japan

[73] Assignee: Matsushita Electric Industrial Co., Ltd., Osaka, Japan

[*] Notice: The portion of the term of this patent subsequent to Nov. 17, 2009 has been disclaimed.

[21] Appl. No.: 945,763

[22] Filed: Sep. 16, 1992

Related U.S. Application Data

[62] Division of Ser. No. 535,080, Jun. 8, 1990, Pat. No. 5,183,631.

[30] Foreign Application Priority Data

| | | |
|---|---|---|
| Jun. 9, 1989 [JP] | Japan | 1-147902 |
| Jul. 7, 1989 [JP] | Japan | 1-175901 |
| Jul. 19, 1989 [JP] | Japan | 1-186488 |
| Sep. 28, 1989 [JP] | Japan | 1-253321 |
| Oct. 26, 1989 [JP] | Japan | 1-280554 |
| Nov. 6, 1989 [JP] | Japan | 1-288356 |
| Nov. 6, 1989 [JP] | Japan | 1-288358 |
| Nov. 6, 1989 [JP] | Japan | 1-288359 |
| Nov. 6, 1989 [JP] | Japan | 1-288360 |
| Jan. 12, 1990 [JP] | Japan | 2-4980 |
| Mar. 26, 1990 [JP] | Japan | 2-76062 |
| Apr. 18, 1990 [JP] | Japan | 2-101934 |

[51] Int. Cl.$^5$ .............................. B32B 5/16
[52] U.S. Cl. .................... 428/403; 419/35; 428/328; 428/329; 428/699; 428/701
[58] Field of Search .............. 428/328, 329, 403, 699, 428/701, 900; 419/35; 501/95

[56] References Cited

U.S. PATENT DOCUMENTS

| | | | |
|---|---|---|---|
| 3,719,519 | 10/1970 | Perugini | 428/328 X |
| 3,739,445 | 6/1973 | Gabriel et al. | 29/182.5 |
| 3,926,567 | 12/1975 | Fletcher et al. | 29/182.5 |
| 4,101,348 | 7/1978 | Berchtold | 419/31 |
| 4,177,089 | 12/1979 | Bankson | 148/31.55 |
| 4,323,395 | 4/1982 | Li | 419/35 |
| 4,431,604 | 2/1984 | Sata et al. | 419/23 |
| 4,594,181 | 6/1986 | Siuta | 428/403 |
| 4,784,818 | 11/1988 | Wakai et al. | 264/291 |
| 4,961,778 | 10/1990 | Pyzik et al. | 419/31 X |
| 5,164,264 | 11/1992 | Kugimiya et al. | 428/403 |

FOREIGN PATENT DOCUMENTS

| | | |
|---|---|---|
| 0088992 | 9/1983 | European Pat. Off. |
| 088992 | 9/1983 | European Pat. Off. |
| 0177276 | 4/1986 | European Pat. Off. |

Primary Examiner—Paul J. Thibodeau
Assistant Examiner—H. Thi Le
Attorney, Agent, or Firm—Panitch Schwarze Jacobs & Nadel

[57] ABSTRACT

A composite material is provided which includes a discrete phase including grains made of a first substance; and a continuous phase including a thin coating film made of a second substance and formed on the surface of each of the grains. The thin coating film has a mean thickness smaller than the mean particle size of the grains. The grains are separated substantially from each other by the thin coating film. The porosity of the composite material is 5% or less.

8 Claims, 6 Drawing Sheets

COMPOSITE MATERIAL COMPRISING METALLIC ALLOY GRAINS COATED WITH A DIELECTRIC SUBSTANCE

CROSS REFERENCE TO RELATED APPLICATIONS

This application is a division of U.S. patent application Ser. No. 07/535,080, filed Jun. 8, 1990, now U.S. Pat. No. 5,183,631.

BACKGROUND OF THE INVENTION

1. Field of the Invention

The present invention relates to an inorganic composite material which is suitable for many applications such as electronic and structural materials, and to a method for producing the composite material.

2. Description of the Prior Art

Various materials with properties appropriate for their particular applications are required in the manufacture of electronic components, structural parts and other products, and composite materials combining the characteristics of two or more substances are often used in order to obtained the required properties. For example, those such as resin-ceramic and metal-ceramic composite materials are widely used. However, the aforesaid resin-ceramic composite materials have the disadvantage of low rigidity. On the other hand, metal-ceramic composite materials have, for example, the form of metal grains 101 dispersed in a ceramic matrix 102, as shown in FIG. 7. The proportion of ceramic constituents in such materials is large, and the metal grains only occupy at most about 50% by volume. The ceramic properties and metallic properties of such composite materials are only manifested to an extent corresponding to the proportions of ceramic material and metal, respectively, which are contained in the mixture. Furthermore, although the rigidity of such composite materials is relatively high, the distances between the grains dispersed in the ceramic matrix is large, and consequently the mechanical strength of such composites is extremely low. Moreover, triangular regions 103 (i.e., regions in the cross-section bounded by at least three grains; triple point of grain boundaries) occupy a relatively large area in articles formed from such composite materials, and numerous pores are present in these triangular regions. Corrosion may begin from these triangular regions, and consequently cracks may occur. Hence, such composite materials tend to exhibit poor weather resistance and low mechanical strength.

In addition to the above-described dispersed type of composite material, for example, multilayer laminated structures composed of thin metal films and thin ceramic films are well known as composite materials applicable to the fabrication of magnetic cores. However, if the relative density of 95% is provided to raise the mechanical strength of such a composite material, then plastic deformation will destroy the laminated structure, and consequently, as in the case of the above-mentioned dispersed type of composite material, both the ceramic properties and metallic properties are only manifested to an extent corresponding with the proportions of ceramics and metal, respectively, contained in the material. For example, no material developed so far has the sufficient magnetic properties of magnetic metals, while at the same time adequately exhibiting the electrical insulation properties associated with ceramics.

SUMMARY OF THE INVENTION

The composite material of this invention, which overcomes the above-discussed and numerous other disadvantages and deficiencies of the prior art, comprises a discrete phase including grains made of a first substance; and a continuous phase including a thin coating film made of a second substance and formed on the surface of the grains, the thin coating film having a mean thickness smaller than the mean particle size of the grains, wherein the grains are separated substantially from each other by the thin coating film and the porosity of the composite material is 5% or less.

In a preferred embodiment, the above-mentioned first substance is a metal, more preferably a magnetic metal, and the above-mentioned second substance is a dielectric.

In a more preferred embodiment, the first substance contains an aluminum metal and the second substance contains an aluminum oxide or aluminum nitride.

In a more preferred embodiment, the above-mentioned second substance contains at least one selected from the group consisting of boron, lead, vanadium, and bismuth compounds.

In a preferred embodiment, the mean thickness of the above-mentioned thin coating film is from 5 to 50 nanometers.

In a preferred embodiment, the above-mentioned first substance is a metal and the above-mentioned second substance is an insulating or highly electric-resistive material comprising super-plastic ceramics.

In a more preferred embodiment, the super-plastic ceramics contain at least one of the group consisting of apatite and zirconium oxide.

In a preferred embodiment, the above-mentioned first substance is a magnetic metal such as an iron-based magnetic metal and the above-mentioned second substance is a highly electric-resistive soft magnetic material such as manganese-zinc ferrite or nickel-zinc ferrite.

In a preferred embodiment, the above-mentioned first substance is an iron-based magnetic metal containing aluminum and the above-mentioned second substance is at least one selected from the group consisting of aluminum oxide, aluminum nitride, and aluminum oxide nitride.

In a preferred embodiment, the above-mentioned grains have a platelet shape.

The method for producing a composite material of this invention, which overcomes the above-discussed and numerous other disadvantages and deficiencies of the prior art, comprises the steps of providing grains made of a first substance; forming a thin coating film on the surface of the grains to prepare coated grains, the thin coating film being made of a second substance and having a mean thickness smaller than the mean particle size of the grains; compacting the coated grains into a green body; and densifying the green body, while forming an additional thin coating film on the uncoated surface of the grains, the additional thin coating film being made of the second substance or a third substance and having a mean thickness smaller than the mean particle size of the grains.

In a preferred embodiment, the above-mentioned thin coating film is formed by heat treatment in an active gas atmosphere.

In a more preferred embodiment, the above-mentioned treatment is nitridation in an atmosphere which contains nitrogen.

In a more preferred embodiment, the above-mentioned treatment is oxidation in an atmosphere which contains oxygen.

In a preferred embodiment, the above-mentioned thin coating film is formed by heat treatment in air.

In a preferred embodiment, the above-mentioned thin coating film is formed by means of a sputtering treatment.

In a preferred embodiment, the above-mentioned thin coating film is formed by a mechanical alloying treatment.

In a preferred embodiment, the above-mentioned green body is densified at a temperature of 300° C. or higher under a pressure of 100 kg/cm$^2$ or more.

In a more preferred embodiment, the pressure is applied to the green body in one direction to deform the grains into a platelet shape.

In a preferred embodiment, the coated grains mentioned above are mixed with a sintering aid and compacted into a green body which is then densified by a sintering treatment.

In a more preferred embodiment, the sintering aid is at least one selected from the group consisting of boron, lead, vanadium, and bismuth compounds.

In a preferred embodiment, the above-mentioned grains are heat-treated in an atmosphere containing an active gas to form a thin coating film on the surface of the grains until an increase in the weight of the coated grains falls in the range of 0.01 to 2.5%, and the coated grains are encapsulated into an airtight vessel containing an active gas and then heat-treated under hydrostatic pressure to form a composite material.

Thus, the invention described herein makes possible the objectives of (1) providing an inorganic composite material, composed of two or more substances, which can exhibit the desired properties of the constituent substances in a synergistic rather than merely an additive manner; (2) providing a composite material which is of high density, rigid, and has excellent mechanical strength, thermal resistance, and weather resistance; (3) providing a composite material having certain desirable combinations of particular characteristics, for example, composite material which consists of 99.9% metal but is also an electrical insulator, or composite material which consists of 99.9% glass but also cuts off infra-red rays and has excellent fracture resistance; and (4) providing a method for producing a composite material having the desirable characteristics mentioned above.

BRIEF DESCRIPTION OF THE DRAWINGS

This invention may be better understood and its numerous objects and advantages will become apparent to those skilled in the art by reference to the accompanying drawings as follows.

DETAILED DESCRIPTION OF THE INVENTION

Figure 1:
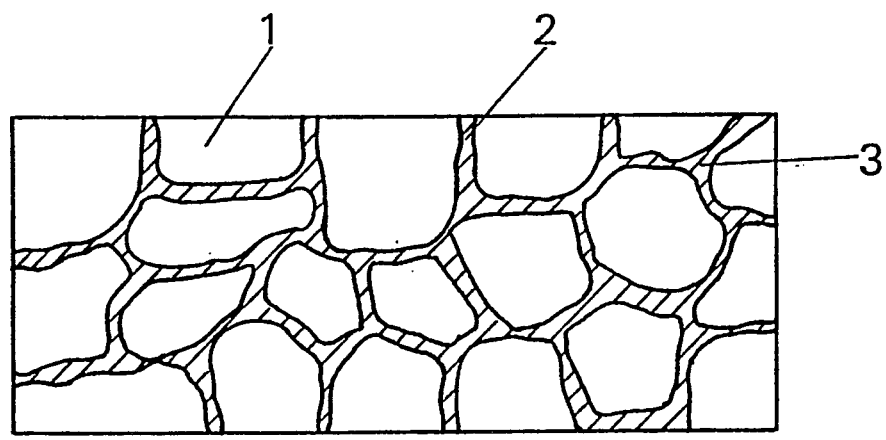
FIG. 1 is an enlarged partial sectional view showing the structure of a composite material of this invention.

The composite material of the present invention comprises a discrete phase including grains made of a first substance, and a continuous phase including a thin coating film made of a second substance. The thin coating film is formed on the surface of each of the grains and has a mean thickness smaller than the mean particle size of the grains. The grains constituting the discrete phase are separated substantially from each other by the thin coating film.

The aforesaid first and second substances are appropriately selected in accordance with the properties required in the final composite material. For example, the first and second substances can be selected from the group consisting of inorganic substances such as metals, metal oxides, metal nitrides, and ceramics. For example, as the first and second substances, a metal (i.e., aluminum) and a dielectric (i.e., aluminum oxide or aluminum nitride) may be selected, respectively, thereby obtaining a composite material combining the properties of these two substances. Excellent magnetic materials can be obtained by selecting a magnetic metal as the first substance. For example, as the first substance, materials with high magnetic permeability such as Si-Al-Fe, Fe-Al, Fe-Ni, or Mo-Ni-Fe alloys, may be used which can provide high saturated magnetic flux density. Soft magnetic materials with electrical insulating properties or high electrical resistivity, such as Mn-Zn ferrite or Ni-Zn ferrite, are suitable for use as he second substance. Compounds such as aluminum oxide, aluminum nitride, or aluminum oxide nitride are also applicable for this purpose. By appropriately selecting the aforesaid types of materials, there can be obtained composite materials capable of attaining high saturated magnetic flux density and also having electrically insulating surfaces.

The production of the composite materials comprises preparing coated grains by forming a thin coating film of the second substance on the surfaces of grains made of the first substance; compacting these coated grains into a green body; and densifying the green body. Any of the well-known methods can be used to form the thin coating film made of the second substance. For example, there may be employed a method of allowing grains made of the first substance to come into contact with an active gas, whereby the active gas reacts with the first substance on the surfaces of the grains, thus forming a layer of a substance different from the original first substance on the grain surfaces; or a method using a sputtering procedure to form a layer of the second substance on the surfaces of grains made of the first substance; or a method using a mechanical alloying process to deposit a layer of the second substance on the grain surfaces. The layer of the second substance should have a mean thickness smaller than the mean particle size of the grains made of the first substance; the appropriate sizes of the grains and thin coating film will vary according to the particular purpose and type of composite material, but ordinarily the range of mean particle sizes is 0.1–100 μm while the mean thickness of the thin coating film is 5–50 nm.

Specific examples of the formation of the thin coating film, include the formation of metal oxide films on the surfaces of metal grains by oxidation treatment, as well as the formation of thin coating films of some different metal on the surfaces of metal grains by sputtering, etc.

Next, the coated grains prepared by using any of the above methods are compacted into a green body which is then subjected to a densification process, thereby obtaining the composite material of the present invention. For example, if the grains are made mainly of ceramics (e.g., if the grains of the first substance are of ceramic composition), then the material can be compacted into the desired shape and then densified merely by sintering. In general, densification can be achieved by high-temperature and/or high-pressure treatment. Ordinarily, densification is accomplished by treatment at a temperature of 300° C. or higher under a pressure of 100 kg/cm$^2$ or higher. When sintering is performed, sintering aids may be added, if necessary. The sintering aids which can be used include compounds of boron, lead, vanadium, or bismuth, such as boron oxide ($B_2O_3$), lead oxide (PbO), vanadium pentoxide ($V_2O_5$), and bismuth trioxide ($Bi_2O_3$). For example, if aluminum powder with aluminum oxide films on the surfaces of the powder grains is prepared and one of these sintering aids is added prior to sintering, then the melting point of the aluminum oxide is lowered, and therefore the aluminum oxide film is more easily softened during the sintering process. Consequently, the sintering is enhanced and the density of the sintered body so obtained (i.e., the desired composite material) is increased. Hence, the mechanical strength and toughness of the sintered body is improved. Similarly, if the first substance is a metal, then the workability and thermal conductivity of the composite material are improved. The reaction products formed from the sintering aids during the sintering treatment remain intermixed with the thin coating film made of the second substance in the composite material obtained.

In the step of densification, a portion of the thin coating films on the grains may in some cases be broken by the operations of compression, etc., thereby exposing the grain surfaces made of the first substance. Therefore, densification is ordinarily performed in such a manner that a thin coating film is again formed by the second substance or some third substance. For example, if the densification is performed in an atmosphere of an active gas, the first substance on the exposed surfaces reacts with the active gas, thereby forming an additional thin coating film. As the active gas, oxygen or nitrogen, for example, may be used. A mixture of these active gases may also be used.

By selecting a metal as the first substance and an electrical insulator as the second substance, a composite material combining metallic properties and highly effective electrical insulation characteristics can be obtained. In such cases, the following method can also be employed. Firstly, a covering phase made of the second substance is formed on the surfaces of grains made of the first substance, and using these coated grains, green bodies with a relative density of 80–95% are prepared. The sintered bodies are prepared so as to have open pores. Next, these sintered bodies are brought into contact with an electrically insulating substance, or a substance which can generate an electrical insulator, or a substance which can react with the metal and thereby form some electrically insulating substance, and are then once again densified under high pressure to form a composite material with a relative density of 95% or greater. For example, Fe-Si-Al, Fe-Ni, Fe-Si, Fe-Al, or Mo-Ni-Fe are used as the first substance, and oxide films are formed on the surfaces of grains made of this first substance. Next, these grains are brought into contact with a substance, such as oxygen or titanium ethoxide, which can react with the first substance, thereby, forming an electrically insulating substance, while simultaneously performing compression molding, and thus obtaining a composite material which has metallic properties as well as effective electrical insulation characteristics. Moreover, the following method of manufacturing magnetic core materials may be mentioned as an application of the aforesaid method. First, grains made of a magnetic alloy are subjected to oxidizing treatment to form an oxide coating on the grain surfaces. This is done in such a manner that the increase in weight amounts to 0.01–2.5%. These coated grains are then encapsulated into an airtight vessel containing an oxygen gas, and heat-treated under hydrostatic pressure until the porosity is reduced to 3% or less. By this procedure, magnetic core materials having magnetic properties of the same order as those of conventional laminated magnetic core materials can be obtained.

If a metal is used as the first substance, and if an electrically insulating or highly electric-resistive material containing inorganic ceramics exhibiting super-plasticity is used as the second material, then the aforesaid super-plastic inorganic ceramics conform well with the deformations of the metal grains during the molding process. Consequently, high densification is attained, and moreover, breakdown of the continuous phase composed of the second substance (in this case, an electrically insulating layer) does not occur. Super-plastic inorganic ceramics applicable for the present purpose include apatite, zirconium dioxide ($ZrO_2$), bismuth trioxide ($Bi_2O_3$), magnesium oxide (MgO), and uranium dioxide ($UO_2$). The apatite is a mineral of the generic formula $X_5(YO_4)_3Z$, where X is $Ca^{2+}$, $Mg^{2+}$ or $Pb^{2+}$, and Y is $P^{5+}$ or $As^{5+}$, and Z is $F^-$, $Cl^-$, $OH^-$. In particular, if a material containing at least one of the apatite and zirconium dioxide is used, then, since these substances exhibit super-plasticity even at relatively low temperatures, the aforesaid advantage can be fully attained.

Figure 2:
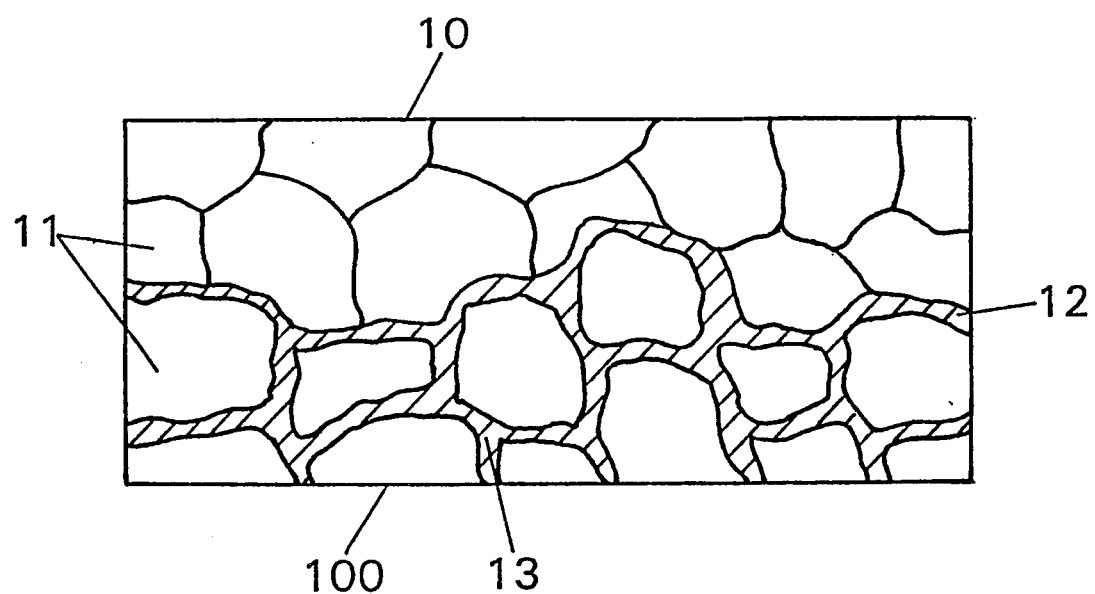
FIG. 2 is an enlarged partial sectional view showing the structure of another composite material of this invention.

The composite materials formed in this manner have, for example, the structure shown in FIG. 1, where the grains 1 made of the first substance are dispersed as a discrete phase in a continuous phase 2 consisting of a thin coating film formed from the second substance. Likewise, composite materials with the structure shown in FIG. 2 can also be obtained by compacting and sintering grains made of a substance either identical with or entirely different from the first or second substance together with the aforesaid coated grains. For example, a composite material of the type shown in FIG. 2 can be formed by selecting aluminum oxide granules as the grains 11 made of the first substance, and forming the continuous phase 12 from aluminum as the second substance. In FIG. 2, the face 10 composed of the first substance exhibits complete electrical insulation characteristics, while the opposite face 100 where the first and second substances are intermingled with each other is electrically conductive.

Figure 3:
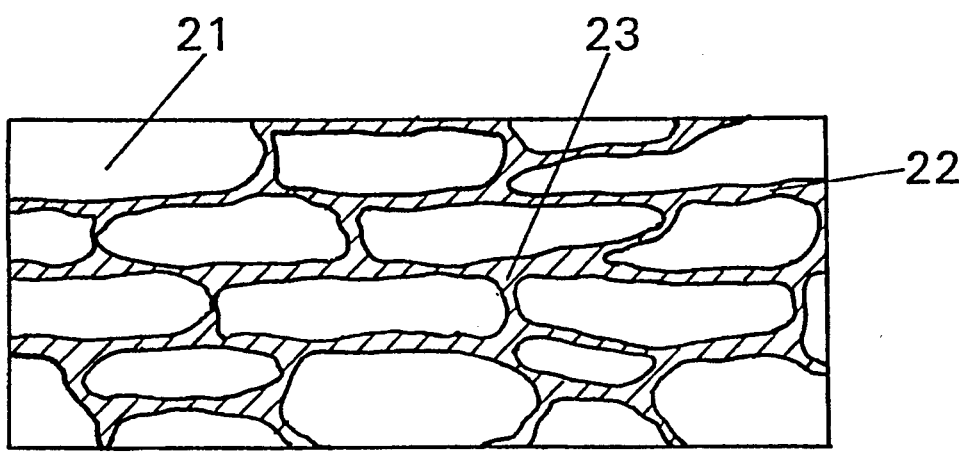
FIG. 3 is an enlarged partial sectional view showing the structure of still another composite material of this invention.

A composite material with the structure shown in FIG. 3, containing a discrete phase consisting of platelet grains 21 made of the first substance and a continuous phase 22 consisting of thin coating films made of the second substance, can be obtained by applying pressure in only one direction during the densification process employed in the preparation of the composite material. Also, platelet grains can be used from the start for the preparation of the composite material. The composite materials obtained exhibit high hardness along the direction of the longitudinal axes of the grains, and superior wear resistance. In all of the aforesaid composite materials, the cross-sectional area occupied by triangular regions (i.e., regions bounded by three or more particles, indicated in the FIGS. 1-3 by reference numerals 3, 13, and 23, respectively) is small as compared with conventional types of composite materials, and therefore the composite materials of the present invention exhibit superior mechanical strength. The porosity of the composite materials of the present invention should ordinarily be 5% or less (i.e., the density thereof being 95% or more), and preferably 3% or less. If the porosity is 5% or less, then the existing pores will be closed and isolated from each other in the composite material, and the interior of the composite material will not communicate with the exterior. Therefore, the composite material will exhibit high mechanical strength as well as superior weather and chemical resistances. The composite materials obtained in this manner have a synergistic combination of the properties of the first and second constituent substances. For example, if the first substance is a metal and the second substance is a metal oxide, then the composite material will have both metallic properties and dielectric characteristics. For example, using the method of the present invention, it is possible to produce composite materials composed of 99.9% metal, while also having electrically insulating characteristics.

DESCRIPTION OF THE PREFERRED EMBODIMENTS

The invention will be further explained by reference to the following examples.

EXAMPLE 1

A powder consisting of grains made of Fe-5% Al alloy (first substance), with a mean particle size of 30 $\mu$m, was oxidized by heating in air at 800° C. for one hour, thereby forming a uniform thin coating film of aluminum oxide (second substance) on the surfaces of the alloy grains. Aluminum oxide is a dielectric, and accordingly the coated grains exhibited complete electrically insulating characteristics. This powder consisting of coated grains was then mixed with 0.05 wt % of a wax volatile at low temperatures as a binder, molded, and, after removal of the binder, sintered in air at a temperature of 1350° C. under a pressure of 50 kg/cm$^2$ for one hour. The sintered body (composite material) so obtained was sufficiently dense, with a porosity of about 4.2%.

When this sample was cut and polished, the surface thereof is a mirror surface, displaying a metallic luster which manifested the characteristics of the Fe-Al alloy constituting the first substance in the composite material. The areal proportion of triangular regions was found to be approximately 3%. Owing to the compression of the grains, the mean size of these triangular regions was extremely small (i.e., approximately 1.2-2 $\mu$m), or less than about 1/15 of the mean particle size of the grains made of the first substance. The electrical resistance of this polished surface was measured by applying a tester, and found to be approximately 15 megohm. Thus, whereas the electrical resistance of a sintered body prepared from a Fe-Al alloy containing 5% aluminum without forming an oxide film exhibited an electrical resistance nearly equal to zero ohm, this composite material, prepared by the method of the present invention, exhibited a metallic luster combined with extremely high electrical resistance, properties ordinarily regarded as incompatible in conventional materials. The hardness of the composite material obtained in this way was also greatly improved, being approximately 30% higher than that of samples formed from the Fe-5% Al alloy in the conventional manner. Moreover, the temperature limit indicating the thermal resistance of the composite material was not merely of the order of about 100° C., as in the case of conventional resin-based composite materials, and in fact no problems of thermal resistance arose even at a temperature of 1000° C.

The composite material obtained in the aforesaid manner was loaded into a thermal-resistance vessel, and the vessel was charged with an active gas (oxygen or nitrogen) at ordinary pressure. This sample was then heated at 800° C. for one hour, and then subjected to hot pressing under a pressure of 2000 kg/cm$^2$ for two hours, thereby obtaining a high-density sintered body with a porosity of 0.1% or less. Analysis revealed that the continuous phase of the final sintered body had been made entirely of oxides or nitrides. The areal proportion of triangular regions in the cross-section was 0.1% or less. The electrical resistance of this sample at the cross-section thereof was 20 megohm or more, above the limit of measurement of the tester, while the hardness was approximately 25% higher than that prior to the hot pressing.

In another experiment, the composite material obtained in the aforesaid manner was loaded into a thermal-resistance vessel, and the vessel was charged with an inactive gas (e.g., argon) at ordinary pressure. This sample was then heated at 800° C. for one hour, and then subjected to hot pressing under a pressure of 2000 arm for two hours, thereby obtaining a high-density sintered body with a porosity of 1.5% or less. However, the electrical resistance of this sample at the cross-section thereof was 1 ohm or less, suggesting that the films at the grain boundaries had been broken. This sort of destruction was also observed by electron microscopy.

EXAMPLE 2

First, a pure iron powder consisting of grains with a mean particle size of 15 $\mu$m was sputtered with aluminum to form a thin coating film of thickness approximately 0.05 $\mu$m (i.e., 50 nm) on the grain surfaces. Using these coated grains, a composite material with a porosity of 0.1% or less was obtained by the same process using an active gas as described in Example 1. As in Example 1, this composite material also exhibited a high electrical resistance and the area of the triangular regions was also extremely small.

EXAMPLE 3

First, a 0.1% polyvinyl alcohol solution was added to a Fe-Al-Si alloy powder consisting of grains with a mean particle size of 3 μm, and this mixture was molded under a high pressure of 5000 kg/cm². This molded body (i.e., green body) was then heated in air at 800° C. for one hour, thereby forming a thin oxide film, composed mainly of $Al_2O_3$ (the second substance) on the surfaces of the powder grains. Next, this molded body was sintered for three hours in air at a temperature of 800° C. under a pressure of 200 kg/cm² in a hot pressing apparatus. From the results of another model experiment, the weight increase in the present case was found to be 0.1%, showing that 99.9% of the sintered body was unoxidized metal. That is, the measurements indicated that the continuous phase composed of the second substance was also formed to some extent during the sintering process. In this case, the element aluminum constituting the first substance was oxidized by the active gas, oxygen, thus forming a film of aluminum oxide (the second substance), which is a dielectric with high electrical insulation characteristics. The porosity of the inorganic composite material obtained in this manner was 5% or less. The polished surfaces of samples of this composite material were mirror-like, with a metallic luster, and exhibited electrical resistance values above 20 megohm. Moreover, the Vickers hardness of this sample was extremely high, i.e., above 700 (c.f., sintered bodies prepared in the same way without forming an oxide film had a Vickers hardness of 500-550). Furthermore, the total proportion of triangular regions in the cross-sections of these samples was exceedingly low, i.e., 2.5% or less, and the aluminum oxide films were extremely thin, with a mean thickness of only about 1/20 of the mean particle size.

Another composite material was also prepared in the same manner, but in this case with the hot pressing apparatus set to a pressure of 400 kg/cm²; the porosity of this material was 3% or less, the electrical resistance was above 20 megohm, and the Vickers hardness was 720. When the composite material was prepared under a pressure of 800 kg/cm², the hardness was even higher, i.e., 750 or higher.

EXAMPLE 4

First, aluminum powder consisting of grains with a mean particle size of 15 μm was subjected to oxidation treatment for two hours at 300° C. in an atmosphere of 5% oxygen. After molding, this material was sintered by hot pressing at 500° C. under a pressure of 500 kg/cm² in an atmosphere of 0.5% oxygen. The inorganic composite material so obtained had a hardness approximately twice that of aluminum, and an electrical resistance equal to or greater than 20 megohm. On the other hand, a comparative sample was also prepared by applying the aforesaid oxidation treatment to the same powder, followed by hot pressing in a nitrogen atmosphere, and the electrical resistance of this comparative sample was approximately 15 megohm. This result showed that oxidation during the sintering process formed films more effectively than sintering under nitrogen gas. Nevertheless, the effectiveness of nitridation was also demonstrated by the aforesaid example. Since the hardness of the composite materials obtained in this manner is high, these composite materials require greater force for machining than the original materials, but nevertheless can be machined by the same methods as those of conventional aluminum materials.

By applying the aforesaid hot pressing treatment in only one direction (i.e., uniaxial compression), the originally almost spherical grains made of aluminum were deformed into platelet grains having a diameter to thickness ratio of at least 2:1. By suitably adjusting the pressure and the direction of the uniaxial force, the degree of flatness can be further changed, thereby obtaining platelet grains with a diameter to thickness ratio varying up to about 10:1. Composite materials prepared in this manner exhibit anisotropic hardness and wear resistance, and these materials are suitable for a wide variety of applications.

EXAMPLE 5

Titanium monohydride powder was added to aluminum powder consisting of grains with a mean particle size of 15 μm, and the mixture was blended in a ball mill for 80 hours to effect surface modification of the aluminum grains. The coated grains so obtained were placed in an atmosphere of nitrogen gas at 550° C., thus converting the surface layer to nitrides. This material was then molded and hot-press sintered at 400° C. and 500 kg/cm², thereby obtaining an inorganic composite material with a hardness approximately 1.5 Times That of conventional aluminum materials and an electrical resistance of 20 megohm. The thermal conductivity of this composite material was high, nearly the same as that of the conventional aluminum materials.

EXAMPLE 6

Samples of an aluminum metal powder consisting of grains with a mean particle size of about 20 μm were heat-treated at the various temperatures shown in Table 1, thereby forming oxide films of various thicknesses on the surfaces of the powder grains.

The respective film thicknesses and compositions were determined from The weight increase during heat treatment, Auger electron spectroscopy, and argon sputtering depth profiles.

These powder samples were molded, vacuum packed into metal aluminum pipe, and subjected to isotropic compression by argon gas for two hours at 600° C. and 1000 kg/cm², thereby preparing a high-density composite material.

Next, 2×1×12 mm rectangular parallelepipedic samples were cut from the high-density composite material obtained in this manner, and the density, electrical resistance (measured by a tester), and thermal conductivity of these samples were measured, with the results shown in Table 1.

For comparison, these parameters were also measured by the same method with respect to samples of metal aluminum and aluminum oxide sintered in the ordinary manner.

TABLE 1

| Heat Treatment | | | Film | | Electrical | Thermal |
|---|---|---|---|---|---|---|
| Temperature (°C.) | Time (hr) | Atmosphere | Thickness (nm) | Density (g/cm³) | Resistance (ohm) | Conductivity (W/m-deg) |
| Not heat treated | | | 2 | 2.63 | <0.1 | 190 |
| 400 | 1 | air | 5 | 2.67 (98.9%) | 180 | 190 |
| 450 | 1 | air | 18 | 2.62 (97.0%) | 32 k | 180 |
| 500 | 1 | air | 35 | 2.59 (95.9%) | 780 k | 160 |
| 600 | 1 | air | 47 | 2.57 (95.2%) | >20M | 150 |
| 600 | 50 | air | 68 | 2.53 (93.7%) | >20M | 110 |
| 620 | 50 | air | 130 | 2.45 (90.7%) | >20M | 80 |

TABLE 1-continued

| Heat Treatment | | | Film Thickness (nm) | Density (g/cm$^3$) | Electrical Resitance (ohm) | Thermal Conductivity (W/m-deg) |
| --- | --- | --- | --- | --- | --- | --- |
| Temperature (°C.) | Time (hr) | Atmosphere | | | | |
| — | — | — | — | 2.70[1] | <0.1 | 200 |
| — | — | — | — | 3.91[2] | >20M | 20 |

Note:
[1] Sample of metal aluminum sintered in the ordinary manner was used.
[2] Sample of aluminum oxide sintered in the ordinary manner was used.

The results in Table 1 show that, for film thicknesses less than 5 nm, the density, electrical resistance, and thermal conductivity of the resulting composite materials were nearly equal to those of the metal aluminum sample tested for comparison. When the film thickness was 5 nm or greater, although the density was slightly lower than that of conventional aluminum materials, the thermal conductivity exhibited no great change. However, the electrical resistance rose markedly. When the film thickness was 50 nm or greater, the electrical resistance was extremely high, while the thermal conductivity dropped to the order of half the thermal conductivity of metal aluminum, and the density dropped below 2.5 g/cm$^3$.

A regards materials used as insulating substrates for electrical components, high electrical resistance is desirable, but if the thermal conductivity is less than half the thermal conductivity of ordinary metals, then the material of interest can hardly be regarded as particularly superior in comparison with conventional substrate materials. Moreover, if the density is low (i.e., below 95%), then numerous problems relating to practical applications arise, such as large numbers of open pores and low mechanical strength. Therefore, even if the electrical resistance is slightly low, if the thermal conductivity is comparable with that of ordinary metals, then the material can be used for purposes such as the slider parts of magnetic heads.

The electrical resistivity of insulating metallic oxide films is high, exceeding 10$^{12}$ ohm-cm, but the overall electrical resistance values of the aforesaid composite materials obtained from coated grains with films of the order of 5–20 nm in thickness were smaller than those expected from the aforesaid resistivity values of metal oxide films. Electron microscopic examination of samples of these composite materials clearly revealed the presence of metallic oxide films at the grain boundaries, hence, the surfaces of the metal grains were almost covered by an insulator. However, the slightly low resistance values mentioned above may possibly be attributed to the existence of pin-holes in parts of the insulator, allowing partial contact between metal grains over a small area.

Accordingly, the coated grains were loaded into an aluminum pipe together with oxygen gas, and hot pressing was applied in the same manner as described above. As a result, even for samples with film thicknesses of 5–50 nm, the electrical resistance values were elevated by a factor of 1.5–100, while the densities remained unchanged. Thus, additional formation of the second substance (in this case, aluminum oxide) during the densification treatment is also desirable.

EXAMPLE 7

The first substance used in this example was a spherically granular powder (mesh #250 or less, mean particle size approximately 30 μm) composed of a Si-Al-Fe alloy containing 10 wt % of silicon, 6 wt % of aluminum and 84 wt % of iron. To this granular powder was added a super-plastic second substance (bismuth trioxide, magnesium oxide, or uranium dioxide) in a proportion of 1 wt % relative to the weight of the Si-Al-Fe alloy. After mixing, this mixture was placed in a ball mill and uniformly blended with toluene as a solvent. This slurry was mixed and dried in a stream of nitrogen gas. Next, 5 wt % of camphor, as a sublimable organic binder, was added and the mixture was further blended in a mortar.

This mixed powder was then molded by isostatic compression under a hydrostatic pressure of 1000 kg/cm$^2$ into a disc of diameter 30 mm and thickness 30 mm. Next, this molded sample was hot pressed at a temperature of 800° C. in an atmosphere of inactive gas, thereby preparing a high-density sintered body; the pressure used was 1000–2000 kg/cm$^2$ and the pressing time was two hours.

The density and electrical resistance of the sintered bodies obtained in this manner were measured by the following methods.

A cross-section of each sintered body was polished, and optical microscopic observation revealed that these sintered bodies were composed of extremely dense material with a porosity of 1% or less. Also, 3×5×10 mm rectangular parallelepipedic samples were cut from each sintered body, and indium-gallium electrodes were formed on the two ends of each sample, whereby the electrical resistivity was measured and found to be 10–100 ohm-cm.

EXAMPLE 8

The first substance used in this example was the spherically granular powder composed of an Si-Al-Fe alloy (the first substance) which was employed in the preparation of Example 7. To this granular powder was added a super-plastic electrically insulating material (second substance), i.e., polycrystalline tetragonal zirconia containing 3 mol % of yttrium oxide (referred to below as Y-TZP) in a proportion of 1 wt % relative to the weight of the Si-Al-Fe alloy. This mixture was placed in a ball mill and uniformly blended with toluene as a solvent. This slurry was mixed and dried in a stream of nitrogen gas. Next, 5 wt % of camphor, as a sublimable organic binder, was added and the mixture was further blended in a mortar.

This mixed powder was then molded by isostatic compression under a hydrostatic pressure of 1000 kg/cm$^2$ into a disc of diameter 30 mm and thickness 30 mm. Next, this molded sample was hot pressed at a temperature of 800° C. in an atmosphere of inactive gas, thereby preparing a high-density sintered body; the pressure used was 1000–2000 kg/cm$^2$ and the pressing time was two hours.

The density and electrical resistance of the sintered bodies obtained in this manner were measured by the same methods as those used for measuring the corresponding parameters in Example 7.

The results showed that these sintered bodies were composed of extremely dense material with a porosity of 1% or less. The electrical resistivity was found to be 10$^{10}$ ohm-cm.

EXAMPLE 9

As a super-plastic electrical insulator (the second substance), in place of Y-TZP, apatite (Ca$_5$(PO$_4$)$_3$OH)

was added in a proportion of 1 wt % to the spherically granular powdered Si-Al-Fe alloy used in the preparation of Example 7, and high-density sintered bodies were prepared from this material by the same process as that used in Example 7.

The density and electrical resistance of sintered bodies obtained in this manner were measured by the same methods as those used for measuring the corresponding parameters in Example 7.

The results showed that these sintered bodies were composed of extremely dense material with a porosity of 1% or less. The electrical resistivity was found to be $10^{10}$ ohm-cm.

Thus, the electrical resistivities of the composite materials obtained in Example 7 were 10-100 ohm-cm, whereas those of the composite materials obtained in Examples 8 and 9 were of the order of 10 ohm-cm. This is attributable to the fact that the Y-TZP or apatite used as the second substance in the latter two Examples exhibits super-plasticity from the low temperature region, and therefore undergoes adequate plastic deformation in response to the plastic deformation of the Si-Al-Fe alloy powder grains.

Thus, high-density (porosity not more 5%), highly electric-resistance composite materials are obtainable if super-plastic substances such as Y-TZP or apatite are used as the electrical insulating material.

COMPARATIVE EXAMPLE 1

Using the Si-Al-Fe alloy of Example 7, the super-plastic insulator Y-TZP was not added, but 5 wt % of camphor was added, molded samples were prepared by the same procedure as that employed for this purpose in the preparation of Example 7, and likewise the samples were hot-pressed under the same conditions.

The density and electrical resistance of the sintered bodies obtained in this manner were measured by the same methods as those used for measuring the corresponding parameters in Example 7.

The results showed that these sintered bodies were composed of extremely dense material with a porosity of 1% or less. However, the electrical resistivity was found to be only of the order of $10^{-4}$ ohm-cm, i.e., of the same order as that of ordinary metals.

EXAMPLE 10

As a material with high electrical resistance, an aluminum oxide powder (the second substance) was added in the proportion of 1 wt % to the Si-Al-Fe alloy of Example 7, sintered bodies (composite materials) were prepared by the same procedure as that employed in the preparation of Example 7, and the sintering density as well as electrical resistance of these composite materials was measured.

The results of these measurements showed that all these composite materials were of high density, with a porosity of 1% or less, however, the electrical resistivities were low, i.e., of the order of $10^{-4}$ ohm-cm, that is, of the same order as that of ordinary metals.

In other experiments, silicon dioxide and calcium oxide were selected as highly electric-resistive materials (electrical insulators) in place of Y-TZP, these oxides were separately added to powdered grains of the aforesaid Si-Al-Fe alloy in the same manner as Y-TZP, sintered bodies were prepared from these samples by the same procedure as that used in the preparation of Example 7, and the porosity (sintering density) as well as electrical resistance of these sintered bodies was measured. The results of these measurements showed that the electrical resistivities of those composite materials with comparatively low density (porosity above 5%) were high ($> 10^3$ ohm-cm), whereas for those composite materials of comparatively high density (porosity below 5%), the electrical resistivity decreased with increasing density, owing to greater destruction of the insulating layer. Among the comparatively high-density composite materials, samples with electrical resistivities ranging from the order of $10^{-4}$ ohm-cm (i.e., comparable with ordinary metals) to the order of 10 ohm-cm were prepared, but this electrical resistivity was subject to considerable variation, and highly electric-resistance materials were not obtained with good reproducibility. Thus, the electrical resistivities of the composite materials obtained by adding the super-plastic electrical insulators of Example 7 were at most of the order of 10 ohm-cm, and resistivities higher than this could not be obtained with these additives.

Thus, as indicated in the descriptions of Examples 7-9, composite materials containing a large proportion of metal but nevertheless exhibiting high electrical resistance can be obtained by the method of the present invention. These types of composite materials have characteristics not obtainable in conventional metal materials. In general, magnetic metal materials exhibit high saturated magnetic flux density but low electrical resistivity, i.e., values of the order of $10^{-4}$ ohm-cm. Consequently, conventional magnetic metal materials could not be utilized as magnetic materials in the high-frequency range because of eddy-current losses. However, since, by using about 1 wt % of a super-plastic electrical insulator, the electrical resistivity can be raised above $10^3$ ohm-cm without diminishing saturated magnetic flux density, the method of the present invention permits the preparation of magnetic core materials which can be used in the high frequency range (e.g., above 1 MHz).

In the preparation of Examples 7-9, super-plastic electrical insulators were added to an Si-Al-Fe alloy, however, the procedure described therein is by no means limited to Si-Al-Fe alloys, in fact, other metals such as Fe-Co alloys, Fe-Si alloys, Fe-Ni alloys, or Fe-Al alloys, etc., indeed, any metal or intermetallic compound can be used for the present purpose. Moreover, the proportion of the added super-plastic substance (second substance) is not restricted to 1 wt %.

Moreover, although camphor was used as a binder for the preparation of the molded sample in the processes of Examples 7-9, the binders which can be employed for this purpose are not restricted to camphor only. For example, any binder which sublimes at high temperatures and pressures, such as polymethyl methacrylate, is also applicable for this purpose. Also, if the sample is loaded into a vessel, then a binder is not necessarily required.

EXAMPLE 11

A spherically granular powder (mesh #250, mean particle size approximately 30 μm) composed of an Si-Al-Fe alloy containing 10 wt % of silicon, 6 wt % of aluminum, and 84 wt % of iron was immersed in an aqueous solution of nickelous chloride, zinc chloride, and ferrous chloride at 70° C., then the mixture was adjusted to pH 7-8 and allowed to react. Thus, metal was precipitated onto the surfaces of powder grains immersed in this solution, and next this precipitated film was oxidized in air to effect ferritization.

By repeating the aforesaid two steps, soft magnetic Ni-Zn ferrite films of thickness 5-50 nm were formed.

In separate experiments, the magnetic and electrical characteristics of Ni-Zn ferrite films of thickness 5-50 nm, as such, were evaluated using Ni-Zn ferrite films deposited on glass substrates. The results of these measurements showed that these films exhibited saturated magnetic flux densities $B_s$ of about 3000 gauss, magnetic permeabilities $\mu$ (CGS) of about 1000, and electrical resistivities $\rho$ ranging from about $10^5$ to $10^9$ ohm-cm.

The aforesaid Si-Al-Fe alloy powder coated with soft magnetic ferrite was molded by compression at 500 kg/cm$^2$, and then hot pressed in nitrogen gas at a temperature of 1000° C. under a pressure of 300 kg/cm$^2$ for two hours, thereby obtaining a high-density composite magnetic material.

Figure 4:
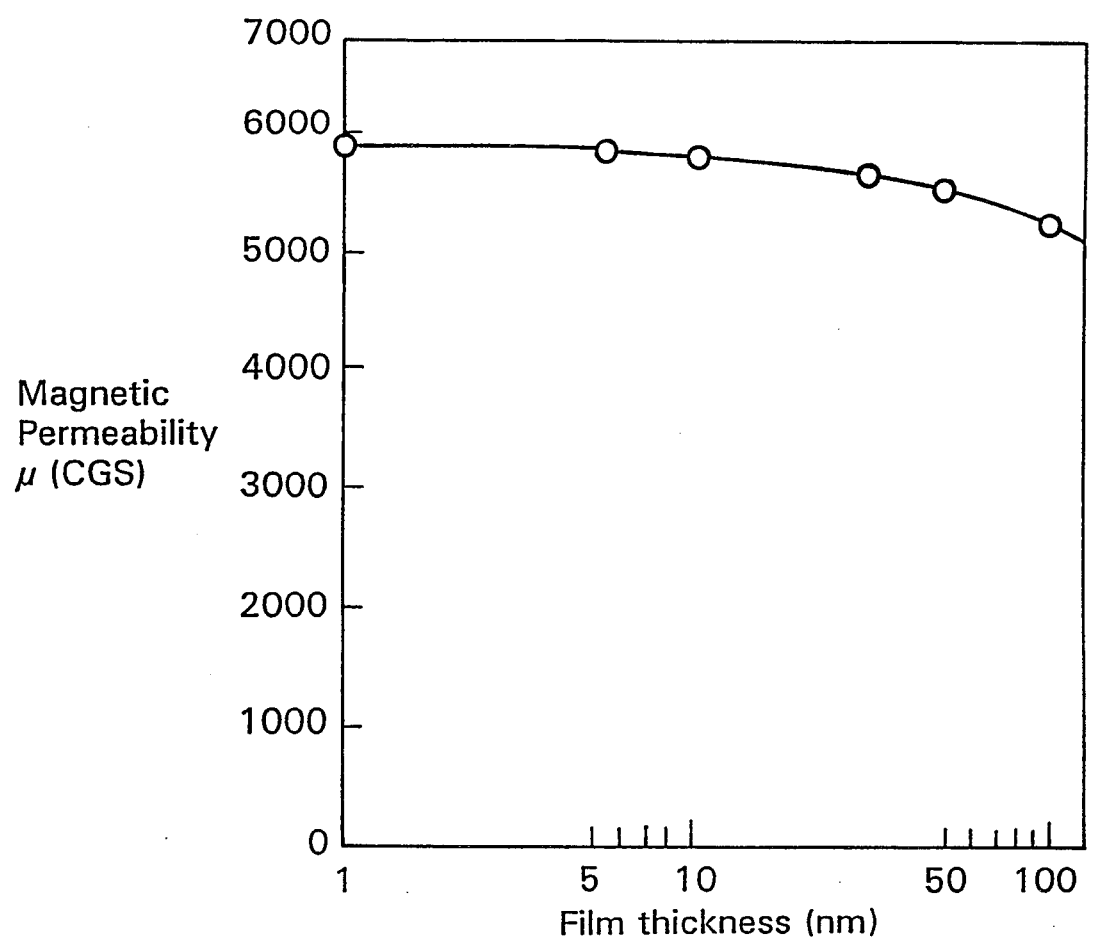
FIG. 4 is a graph showing the relationship between the magnetic permeability and the film thickness of a composite material of this invention.
Figure 5:
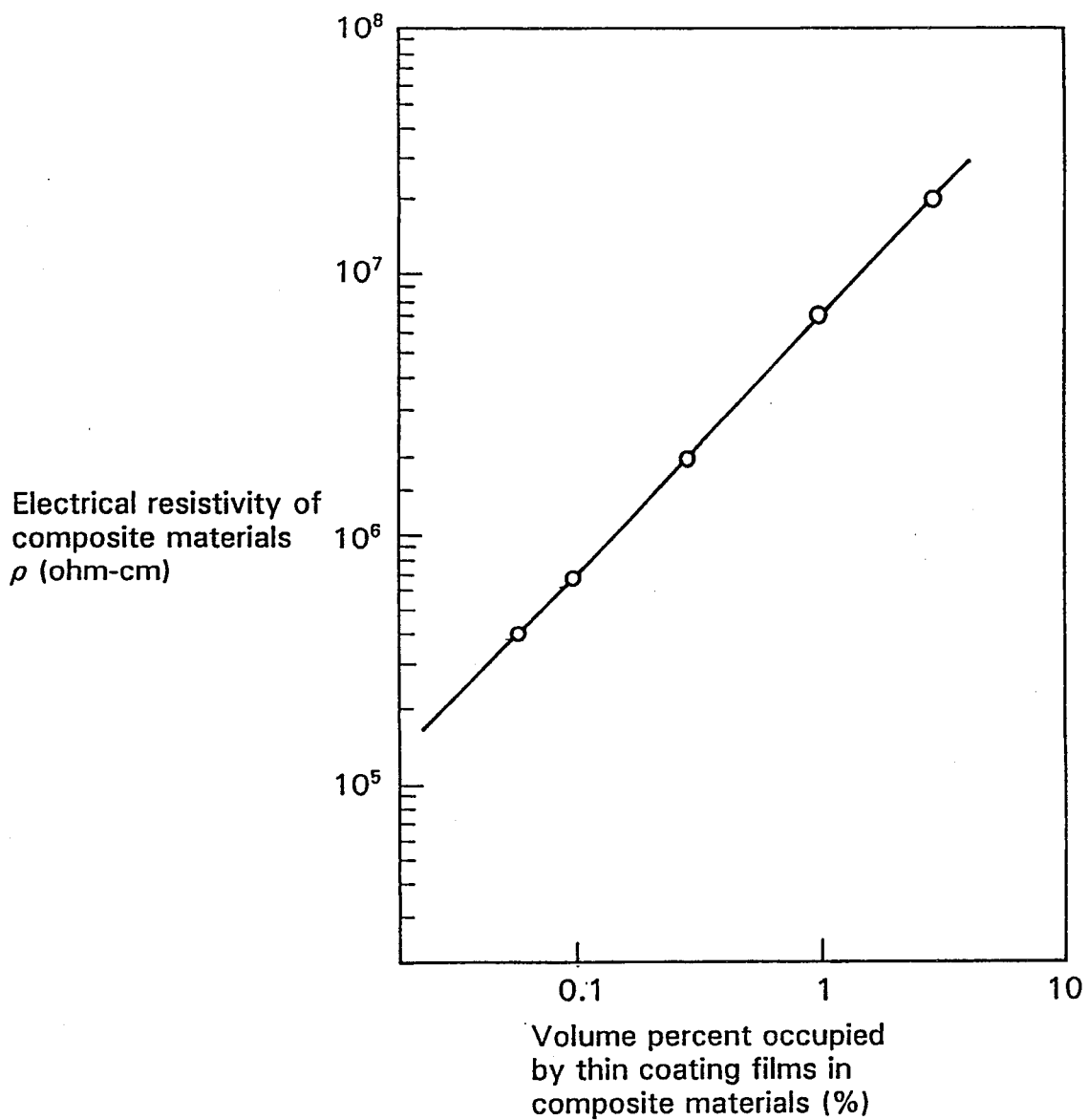
FIG. 5 is a graph showing the relationship between the electrical resistivity of the composite material and the volume percent occupied by the thin coating films in the composite material.

The magnetic and electrical characteristics of this composite magnetic material are shown in FIGS. 4 and 5, respectively. FIG. 4 shows the relationship between the thickness of the Ni-Zn ferrite film and the magnetic permeability $\mu$ (CGS) at the frequency 100 kHz) of the corresponding composite material. FIG. 5 shows the relationship between the volume percent occupied by Ni-Zn ferrite films in the composite material and the electrical resistivity of the composite material.

From these results, one observes that the magnetic permeability $\mu$ (CGS) was 5000-6000, virtually independent of thickness in the range 5-50 nm, while the electrical resistivity $\rho$ ranged from about $10^5$ to $10^7$ ohm-cm. The saturated magnetic flux density $B_s$ of this composite magnetic material was 9600 gauss, almost identical with that of the original powdered material. Similar results were obtained in the case where the same powder was coated with an Mn-Zn ferrite film.

The magnetic and electrical characteristics of Mn-Zn ferrite films were evaluated using films deposited on glass substrates. The results of these measurements showed that these films displayed saturated magnetic flux densities $B_s$ of about 5000 gauss, magnetic permeabilities $\mu$ (CGS) of about 1000, and electrical resistivities $\rho$ ranging from about 1 to $10^3$ ohm-cm.

EXAMPLE 12

A spherically granular powder composed of the Si-Al-Fe alloy which was employed in the preparation of Example 11 was immersed in an aqueous solution of ethoxysilane and the mixture was thoroughly agitated. Then, this mixture was suction filtered and the residue was dried at 80° C., thereby forming a nonmagnetic silicon dioxide film of thickness 50 nm on the surfaces of the powder grains.

This silica-coated Si-Al-Fe alloy powder was molded by compression at 500 kg/cm$^2$, and the green body so formed was then subjected to hot pressing in an atmosphere of nitrogen gas under a pressure of 300 kg/cm$^2$ for a temperature of 1000° C. for two hours, thereby obtaining a high-density composite magnetic material.

This composite magnetic material exhibited a high resistivity of $10^9$-$10^{10}$ ohm-cm. However, the magnetic permeability $\mu$ (CGS) at the the frequency of 100 Hz was low, i.e., 300. When the silicon dioxide film was prepared with a thickness of 5 nm, the electrical resistivity $\rho$ of the composite magnetic material so obtained ranged from $10^6$ to $10^8$ ohm-cm, and the magnetic permeability $\mu$ (CGS) was 2500.

EXAMPLE 13

The spherically granular powder composed of the Si-Al-Fe alloy used in various examples described above was immersed in an aqueous solution containing nickelous chloride and ferrous chloride at a temperature of 70° C., then the mixture was adjusted to pH 7-8 and allowed to react, whereby metal was precipitated from the solution onto the powder grains, and an Fe-Ni (permalloy) film of thickness 50 nm was formed on the grain surfaces.

This Si-Al-Fe alloy powder, coated with an Fe-Ni film, was then molded by compression at 500 kg/cm$^2$, and the resulting green body was hot pressed in an atmosphere of nitrogen gas at a temperature of 1000° C. under a pressure of 300 kg/cm$^2$ for two hours, thereby obtaining a high-density composite magnetic material.

In separate experiments, the magnetic and electrical characteristics of Fe-Ni films with a thickness 50 nm, as such, were evaluated using Fe-Ni films deposited on glass substrates. The results of these measurements showed that these films exhibited saturated magnetic flux densities $B_s$ of about 8700 gauss, magnetic permeabilities $\mu$ (CGS) of about 20,000, and electrical resistivities $\rho$ of about 60 microhm-cm.

The electrical resistivity of the aforesaid composite magnetic material was 100 microhm-cm. Also, the magnetic permeability $\mu$ (CGS) of this composite magnetic material was 5500 at the low frequency of 100 Hz and 30 at the high frequency of 1 MHz.

These results show that if the electrical resistivity of the composite magnetic material is low, then the magnetic permeability in the high frequency range drops abruptly because of eddy-current loss.

EXAMPLE 14

The spherically granular powder composed of the Si-Al-Fe alloy used in the preparation of Example 11 was immersed in an aqueous solution containing nickelous chloride and ferrous chloride at a temperature of 70° C., then the mixture was adjusted to pH 7-8 and allowed to react, whereby metal was precipitated from the solution onto the powder grains. This surface film was then ferritized by oxidation in air.

By repeating the aforesaid step, a NiFe$_2$O$_4$ ferrite film with a thickness of 100-1000 nm was formed on the grain surfaces.

In separate experiments, the magnetic and electrical characteristics of these NiFe$_2$O$_4$ films with a thickness of 100-1000 nm, as such, were evaluated using NiFe$_2$O$_4$ films deposited on glass substrates. The results of these measurements showed that these films exhibited saturated magnetic flux densities $B_s$ of about 3400 gauss, magnetic permeabilities $\mu$ (CGS) of about 10, and electrical resistivities $\rho$ of about $10^3$-$10^4$ ohm-cm.

This Si-Al-Fe alloy powder, coated with the aforesaid ferrite film, was then molded by compression at 500 kg/cm$^2$, and the resulting green body was hot pressed in an atmosphere of nitrogen gas at a temperature of 1000° C. under a pressure 300 kg/cm$^2$ for two hours, thereby obtaining a high-density composite magnetic material.

The magnetic permeability $\mu$ (CGS) of this composite magnetic material was 120 at the frequency of 1 MHz, while the electrical resistivity $\rho$ was 10-10$^2$ ohm-cm. These measurements show that if the surfaces of the powder grains are covered with an insulating film of low magnetic permeability and a thickness of 100 nm or more, then the magnetic permeability of the resulting composite material decreases.

As shown by the aforesaid and Examples 11-14, if a material with high electrical resistivity and soft magnetic properties is selected as the second substance referred to above, and if the surfaces of grains of a magnetic metal material are covered with this second substance, then the composite materials so obtained have high electrical resistivity as well as high saturated magnetic flux density and high magnetic permeability.

If a magnetic material with high electrical resistivity is chosen as the second substance, then a composite material of high saturated magnetic flux density and high magnetic permeability can be obtained. As demonstrated by Example 11, if ferrite materials, which have high electrical resistivity and high magnetic permeability, and in particular, Mn-Zn ferrites or Ni-Zn ferrites, are employed as the second substance, then composite materials with high magnetic permeability in the high frequency range can be obtained.

EXAMPLE 15

A Ni-Fe alloy with a Ni:Fe at the weight ratio of 78.5:21.5 in the form of a spherically granular powder (mesh #250, mean particle size 30 $\mu$m) was prepared. Insulating films several nanometers in thickness, composed mainly of aluminum nitride, were formed on the surfaces of these powder grains by sputtering for 5 minutes with an aluminum target in a nitrogen atmosphere.

This powder of coated grains was molded by compression at 500 kg/cm$^2$, after which the green body was hot pressed in an atmosphere of argon gas at a temperature of 800° C. under a pressure of 1000 kg/cm$^2$, thereby forming a high-density (relative density 98-99%) composite magnetic material.

Figure 6:
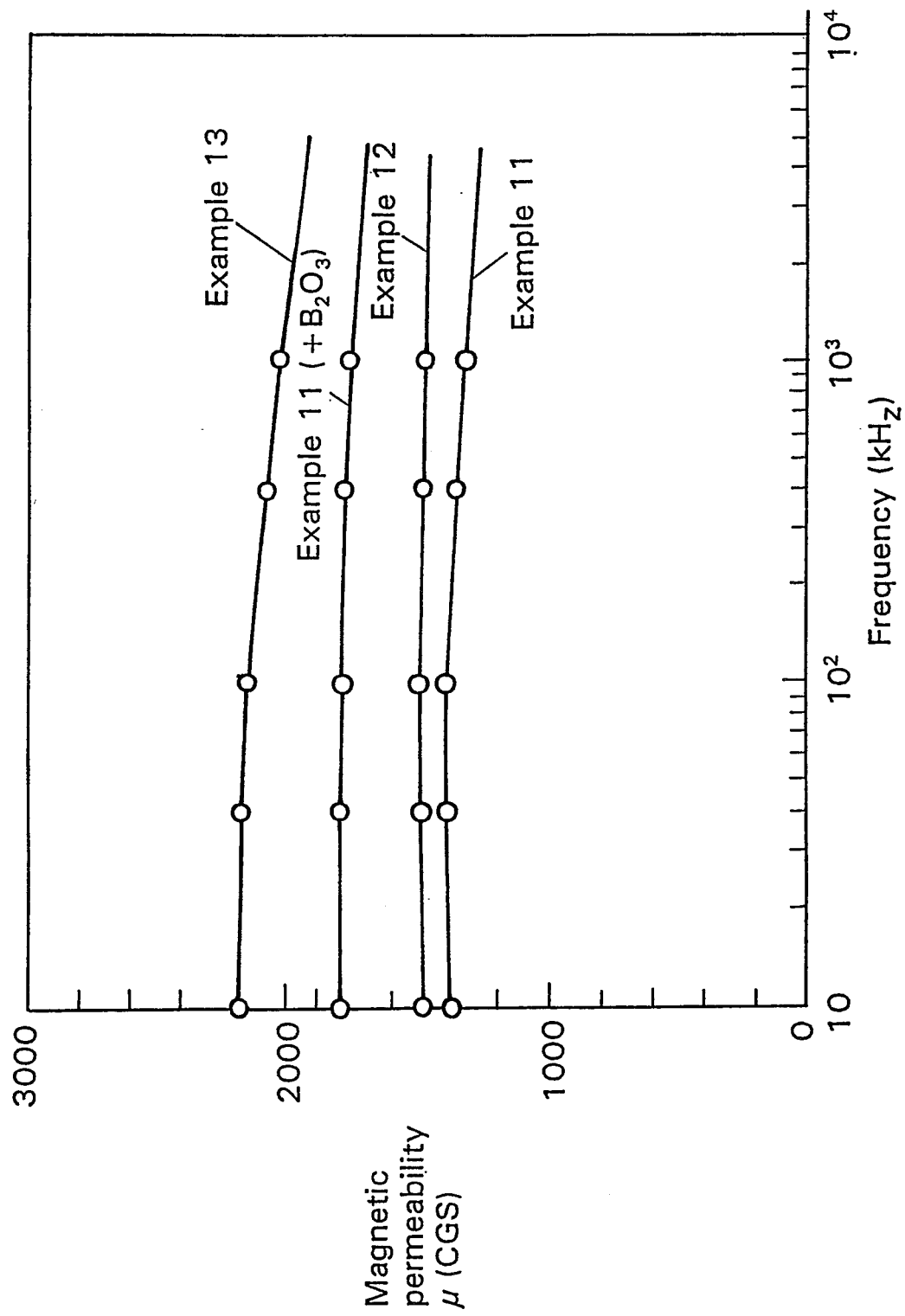
FIG. 6 is a graph showing the relationships between the magnetic permeability and the frequency with respect to the composite materials obtained in Examples 11 to 13 of this invention.
Figure 7:
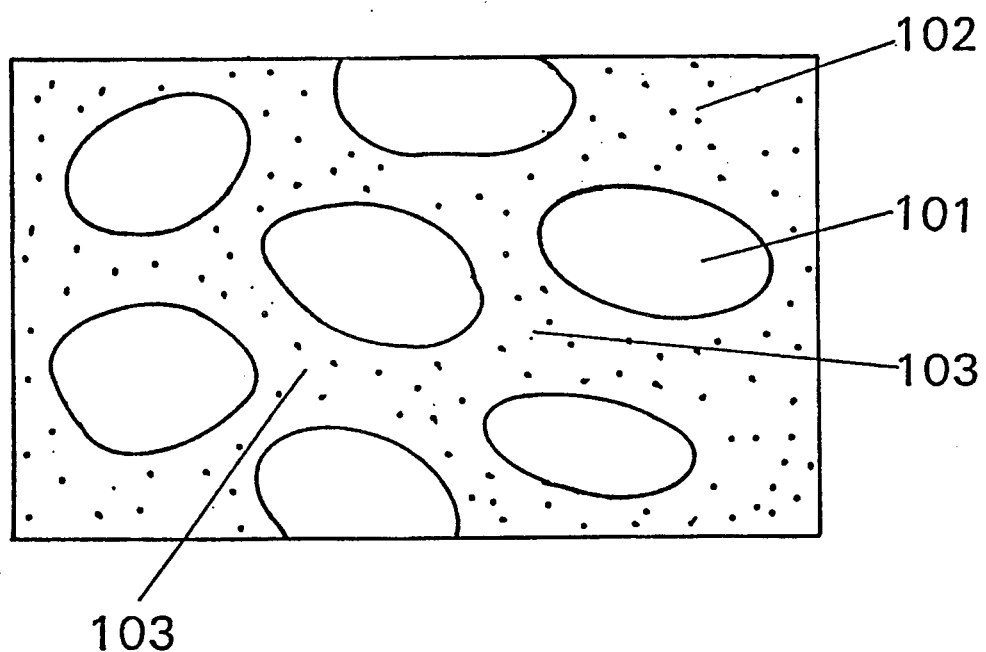
FIG. 7 is an enlarged partial sectional view showing a convention composite material.

The magnetic characteristic (magnetic permeability versus frequency) of this composite magnetic material is shown in FIG. 6.

The electrical resistivity of the aforesaid composite magnetic material was high, i.e., $10^7$-$10^8$ ohm-cm, therefore, the magnetic permeability $\mu$ (CGS) was almost independent of frequency, exhibiting values of about 1300-1400 throughout the range of 10 kHz to 1 MHz.

Next, the same raw material was compression molded after the addition of boron oxide in a proportion of 0.05-0.10 wt % as a sintering aid, and then hot pressed under the same conditions as described above. High density was attained (relative density 99.5%), the thickness of the insulating layer was approximately 7 nm, and high electrical resistivity was also obtained. This composite material exhibited a magnetic permeability $\mu$ (CGS) of 1700-1800 even in the high frequency range.

EXAMPLE 16

A Ni-Al-Fe alloy with a Ni:Al:Fe in a weight ratio of 10:6:84 in the form of a spherically granular powder (mesh #250, mean particle size 30 $\mu$m) was prepared. Insulating films 30 nm in thickness, composed mainly of aluminum nitride, were formed on the surfaces of these powder grains by heat treatment at 800° C. for one hour in a nitrogen atmosphere (flow rate 200 cc/min).

This powder of coated grains was molded by compression at 500 kg/cm$^2$, after which the green body was hot pressed in an atmosphere of argon gas at a temperature of 900° C. under a pressure of 1000 kg/cm$^2$, thereby forming a high-density (relative density 98-99%) composite magnetic material.

This composite magnetic material exhibited high electrical resistivity $\rho$, i.e., $10^8$-$10^9$ ohm-cm, while at the frequency of 1 MHz the magnetic permeability $\mu$ (CGS) and saturated magnetic flux density of this composite were 1470 and 9500 gauss, respectively.

This example shows that, by using metal grains with aluminum as the principal component and heat-treating these grains in an atmosphere of nitrogen gas, which is a simple method highly suitable for mass production, uniform insulating films composed mainly of aluminum nitride can be formed on the grain surfaces. Tests also confirmed that these thin coating films have sufficiently high mechanical strength to withstand breakage at high temperatures and pressures.

EXAMPLE 17

Using the same spherically granular Ni-Al-Fe alloy powder as was employed in Example 16, a 5-10 nm thick insulating film composed mainly of aluminum nitride was formed on the surfaces of these spherical powder grains by the same method as that used in Example 16.

Boron oxide, lead oxide, bismuth trioxide, vanadium pentoxide, or magnesium oxide were combined with this alloy powder as additives in the proportion of 0.01-0.50 wt %. The quantity of this additive was chosen so that, for example, a boron oxide film of thickness 2-100 nm in thickness would be formed on the surfaces of the aforesaid grains. This mixture was molded by compression at 500 kg/cm$^2$, and then hot pressed for two hours at a temperature of 900° C. under a pressure of 1000 kg/cm$^2$, thereby obtaining a high-density (relative density 99%) composite magnetic material.

The thickness of the thin coating film constituting the continuous phase of this composite magnetic material was 5-50 nm, which was the combined thickness of the aluminum nitride and the boron oxide, lead oxide, bismuth trioxide, vanadium pentoxide, or magnesium oxide. All of these composite materials exhibited high electrical resistivities $\rho$, ranging from $10^8$ to $10^9$ ohm-cm. FIG. 6 shows the relationship between the frequency and the magnetic permeability with respect to the composite material obtained when boron oxide was used as the additive. As seen from FIG. 6, the magnetic permeability $\mu$ (CGS) of this composite material at frequency of 1 MHz was 2000. The saturated magnetic flux density of the composite material was 9600 gauss. Similar results were obtained when lead oxide, bismuth trioxide, or vanadium oxide were used in place of boron oxide, confirming that all of these substances are effective as sintering aids. However, when magnesium oxide was used for this purpose, the magnetic permeability $\mu$ (CGS) ranged from about 1000 to 1500. Also, when the film thickness exceeded 50 nm, the value of $\mu$ decreased below 1000.

Comparison of the present results with those of Example 16 shows that the addition of lead oxide, bismuth trioxide, vanadium pentoxide, or boron oxide provides high electrical resistivity even for thinner films, therefore, increases in the value of the magnetic permeability $\mu$ due to magnetic resistance can be suppressed, and hence high permeabilities can be obtained even in the high frequency range.

Next, aluminum oxide insulating films of thickness 5-30 nm were formed on the grain surfaces of Si-Al-Fe alloy powder, and to these coated grains was added a quantity of boron oxide sufficient to form additional covering films with a thickness of 10–20 nm on the surfaces of the coated grains. This mixture was hot pressed under the conditions stated above, thereby obtaining a high-density composite material. This composite material exhibited high electrical resistivity $\rho$, i.e., $10^8$–$10^9$ ohm-cm, as well as high magnetic permeability $\mu$ (CGS), i.e., about 2500. However, when the other additives (bismuth trioxide, vanadium pentoxide, or lead oxide) were used, the value of the magnetic permeability $\mu$ (CGS) was about 2000, showing that boron oxide is particularly suitable for the present purpose. In addition, for other magnetic alloys, in particular, iron alloys containing aluminum, high magnetic permeabilities were obtained by using combinations of aluminum oxide and boron oxide, aluminum nitride and boron oxide, or aluminum oxide nitride and boron oxide in the above process.

EXAMPLE 18

This example will describe a structural material.

First, an aluminum powder consisting of grains with a mean particle size of 20 $\mu$m was subjected to superficial oxidation treatment by heating at 600° C. for ten hours in an air stream at a flow rate of 200 cc/min, thereby forming an insulating film several tens of nanometers in thickness, composed mainly of $Al_2O_3$, on the surfaces of the powder grains. These coated powder grains were then molded into a disk-shaped sample by compression at 500 kg/cm$^2$.

The green body sample so obtained was maintained at a temperature of 600° C. in air for a period of 30 minutes, and then hot pressed at 500 kg/cm$^2$, this pressure being maintained for 30 minutes, after which the pressure was released and the sample was cooled, thereby obtaining a disk-shaped composite material of diameter 13 mm and thickness 9.6 mm.

The electrical resistivity of the composite material of this example was $6 \times 10^9$ ohm-cm. As for mechanical properties, the ductility of this composite material was found to be virtually the same as that of conventional aluminum materials. The thermal conductivity of this composite material was about 200 W/m-deg, which is higher than that of conventional Al-$Al_2O_3$ composite materials.

EXAMPLE 19

This example will describe a composite material for use in magnetic cores.

Substantially spherical grains composed of Sendust (an Fe-Si-Al alloy) with a mean particle size of 20 $\mu$m, prepared by gas atomization, were heat-treated at temperatures from 850° C. to 950° C. for periods ranging from one to ten hours in atmospheres with various concentrations of oxygen. The weight changes which occurred in this process were measured. Also, Auger electron spectroscopic analysis of the surfaces of these powder grains revealed that, in each case, aluminum oxide was the main compound formed during this treatment.

Next, this powder was sealed in an airtight vessel together with oxygen, after which the material was sintered with a hot isostatic press apparatus for three hours at a temperature of 800° C. under a pressure of 2000 kg/cm$^2$. The surfaces of the sintered bodies so obtained were mirror polished, and the surface electrical resistance was measured with a tester over an arbitrarily selected interval of approximately 10 mm. Next, samples 0.5 mm in thickness were prepared, and the magnetic permeability of these samples was measured at the frequency of 1 MHz. The results of these measurements are shown in Table 2. The same tests were also applied to sintered bodies prepared from the same alloy powder which had not undergone the initial heat treatment described above; the results for these samples are also shown in Table 2.

TABLE 2

| Weight Increase of Grains (%) | Electrical Resistance (ohm) | Magnetic Permeability (CGS) (at 1 MHz) |
| --- | --- | --- |
| Not heat treated | ~0 | 70 |
| 0.010 | 5 | 700 |
| 0.10 | 20 | 1500 |
| 0.5 | 50 | 1000 |
| 1.0 | 700 k | 800 |
| 1.8 | >20M | 700 |
| 2.5 | >20M | 100 |
| 3.0 | >20M | 80 |

The data in Table 2 shows that greater weight increase of the powder is associated with greater electrical resistance. If the weight increase is 1.8% or greater, then the sintered body so obtained, although essentially a bulk metal in composition, exhibits electrical resistance close to that of an insulator.

Measurements of the magnetic permeability of samples with a thickness of 0.5 mm at the frequency of 1 MHz revealed that the magnetic permeability (CGS) of samples prepared from untreated powder was low, i.e., about 70, due to eddy-current losses. The powder with a weight increase of 0.10–0.5% due to heat treatment exhibited nearly the maximum magnetic permeability, and weight increases beyond this range actually resulted in diminished magnetic permeability, which in fact, decreased to the low value of 80 for samples with 3% weight increase. This is attributed to the greater resistance to penetration of magnetic flux by thicker layers of nonmagnetic material (oxide layers) as well as loss of magnetic properties by the magnetic phase itself as a result of oxidation.

As shown by the schematic illustration in FIG. 1, the morphological structure of the sintered bodies (composite materials) obtained in this example comprises a discrete phase including grains 1 made of the first substance (a magnetic metal material) and a continuous phase including a thin coating film 2 made of the second substance (an insulating film, in the present case, aluminum oxide). In actual practice, the thickness of this insulating layer 2 is several tens of nanometers. The size of the grains used in such a composite material should be appropriately selected according to the frequency band in which the magnetic core is to be used, i.e., according to the degree of eddy-current loss. The powder is loaded in an airtight vessel containing oxygen when hot isostatic pressing is performed so that even if the insulating layer is broken by plastic deformation of the powder grains during the process of sintering, oxygen is replenished and an oxide film (insulating film) is reformed at the damaged portions. As a result, passage of current between the metal grains is suppressed. Although oxygen gas was used for this purpose in this example, any active gas which reacts with the first substance and thereby produces the second substance or a third insulating substance can also be used in place of oxygen.

The process of sintering by means of heat and isostatic pressure which was used in the preparation of this example is advantageous in that the grains undergo isotropic deformation and therefore the insulating film is relatively insusceptible to breakage. The weight increase of the grains resulting from reaction with the active gas should desirably be in the range from 0.01% to 2.5%. If this weight increase is 0.01% or less, then the insulation effect is often inadequate, whereas if the weight increase amounts to 2.5% or more, then the magnetic characteristics deteriorate.

The porosity of the composite material so obtained should desirably not be more than 3%, since composite materials with a porosity of 3% or less have sufficient mechanical strength. Even in cases where the composite material is to be used in magnetic heads, adequate performance is not secured if the porosity amounts to 3% or more.

Although an Fe-Si-Al alloy was used in this example, similar results are obtainable if other alloys are used, for example, any appropriate alloy containing aluminum and silicon.

EXAMPLE 20

An Si-Al-Fe alloy composed of 10 wt % silicon, 6 wt % aluminum, and 84 wt % iron in the form of a spherically granular powder (mean particle size approximately 30 μm) was heat-treated in air at a temperature of 600° C. for 5 minutes, thereby forming a coating film on the surfaces of the powder grains. The thickness of this coating film was estimated from the weight increase which occurred during heat treatment and the results of Auger electron spectroscopy as well as the argon sputtering depth profile, and was found to be approximately 9 nm.

The powder was molded and hot pressed in an atmosphere of argon at a temperature of 800° C. and a pressure of 1000 kg/cm$^2$, thereby preparing the primary samples. Several of these primary samples were prepared by varying the hot pressing time between 5 minutes and 2 hours. Density measurements of these primary samples showed that the relative densities were 78% for those hot pressed for five minutes, 90% for those hot pressed for twenty minutes, and 98% for those hot pressed for two hours, with respect to the theoretical density of 6.89 g/cm$^3$. These three varieties of samples were designated as Nos. 1, 2, and 3, respectively. Next, the following three types of treatment were applied to each of these three varieties of molded samples, and the resulting samples were respectively designated as Nos. 4-6, Nos. 7-9 and Nos. 10-12.

Samples Nos. 4-6 were prepared from samples Nos. 1-3, respectively, by heat-treating in air at 700° C. for approximately 10 minutes, followed by vacuum packing into airtight vessels.

Samples Nos. 7-9 were prepared from samples Nos. 1-3, respectively, by loading into airtight vessels together with approximately 10 cc of oxygen.

Samples Nos. 10-12 were prepared as follows. Three 100 ml aliquots of a 0.01M ethanol solution of titanium ethoxide were prepared, and the aforesaid samples Nos. 1-3 were added to the three respective aliquots. Heat refluxing was performed at 70° C. while a 1:3 water-ethanol mixture was added dropwise to each solution until the concentration of water reached 0.002M after three hours. After completion of this process, the products were filtered, then the powders so obtained were dried at 150° C. and heat-treated in air at 400° C. for one hour. The powder samples obtained in this manner were then vacuum packed into airtight vessels.

The first type of treatment described above was performed for the purpose of increasing the thickness of the insulating film around the pores of the primary samples. The second type of treatment described above was performed for the purpose of filling the pores of the primary samples with oxygen gas in order to induce a reaction between this gas and the metal at the pore sites during the high-pressure molding step (described below) and thereby increase the thickness of the insulating film. The third type of treatment described above was performed for the purpose of forming a titanium dioxide film on the surfaces of the pores of the primary samples.

The nine varieties of samples obtained in this manner were subjected to isostatic pressing for one hour at 800° C. and 2000 kg/cm$^2$ in an argon atmosphere, thereby obtaining the final secondary samples. Then, 2×1×12 mm prismatic test samples were cut from the high-density composite material so obtained, following which the specific gravity, electrical resistance (using a tester), and magnetic characteristics of these test samples were measured, with the results shown in Table 3.

TABLE 3

| | Physical properties of composite materials | | | | | |
|---|---|---|---|---|---|---|
| | Density (g/cm$^3$) | | Electrical Resistance | Saturated Magnetic Flux Density | Magnetic Permeability (CGS) | |
| Sample No. | Primary Sample | Secondary Sample | (ohm) | (kilogauss) | 1 kHz | 1 MHz |
| 1 | 5.37 | — | >20M | 8 | 280 | 240 |
| 2 | 6.34 | — | >20M | 10 | 670 | 570 |
| 3 | 6.75 | — | 1.0 | 11 | 1120 | 430 |
| 4 | 5.37 | 6.86 | 0.2 | 11 | 970 | 350 |
| 5 | 6.34 | 6.85 | >20M | 11 | 1020 | 970 |
| 6 | 6.75 | 6.85 | <0.1 | 11 | 1100 | 120 |
| 7 | 5.37 | 6.84 | 0.4 | 11 | 850 | 230 |
| 8 | 6.34 | 6.84 | >20M | 11 | 1060 | 990 |
| 9 | 6.75 | 6.83 | <0.1 | 11 | 1080 | 110 |
| 10 | 5.37 | 6.77 | 2 k | 11 | 690 | 470 |
| 11 | 6.34 | 6.79 | >20M | 11 | 1000 | 930 |
| 12 | 6.75 | 6.82 | <0.1 | 11 | 1140 | 70 |

As can be seen from Table 3, among samples Nos. 1-3, which were not subjected to a second pressurizing treatment, the higher sample No. 3 (density 98%) exhibited the lowest electrical resistance. Moreover, sample No. 3 exhibited a high magnetic permeability at 1 kHz, but the magnetic permeability at 1 MHz was less than half of the value at 1 kHz. The lower density samples Nos. 1 and 2 had high electrical resistance, and consequently the frequency dependence of the magnetic permeability in these samples was slight. However, due to their low density, these samples exhibited low saturated magnetic flux density as well as low magnetic permeability.

Samples obtained by applying further high-pressure sintering after the above-described treatment had been applied to these primary samples, all exhibited low electrically insulating resistance, except for that with primary sinter density 90%, and consequently the frequency dependence of the magnetic permeability became very pronounced. On the other hand, the electrical resistance of the sample with primary density 90% was not greatly lowered by further densification, and therefore the resulting composite material exhibited high magnetic permeability even up to the high frequency range.

For purposes of comparison, the aforesaid three varieties of primary samples were also vacuum packed into airtight vessels without any additional treatment, and composite materials were then obtained from these samples by applying isostatic pressure for one hour in an argon atmosphere under the same conditions. Evaluation of the properties of these composite materials revealed that all materials had low electrical resistance and that their magnetic permeability exhibited a pronounced frequency dependence.

In general, even if the surface of a metal powder is completely covered by an electrical insulator, if this material is then compressed so as to form a molding of density nearly 100%, then the deformation of the metal powder grains causes a change in surface area, and a portion devoid of an insulating film is formed. As a result, the metal grains come into mutual contact, and this presumably causes a decrease in electrical resistance. As was demonstrated by the results concerning samples Nos. 1–3, destruction of the insulating film does not occur unless the density becomes quite high. However, by the method of this example, high density as well as high electrical insulation characteristics can be attained only with he formation of insulating substance at the sites where destruction of the insulating film is prone to occur and without increasing the overall quantity of the insulating substance.

In addition to those described in this example, the inventors have also prepared samples with various primary sintered densities, and have ascertained that relative densities in the range from 80% to 95% are most advantageous for the present purpose. If the density of the primary sintered bodies in excessively high, then the pores are closed, which impedes filling with an insulating substance or a compound which can form an insulating substance by an appropriate chemical reaction. On the other hand, if the density of the primary sintered bodies is unduly low, and if a large quantity of an electrically insulating substance is added, then the fraction of the resulting composite material occupied by the insulating substance is unduly large, which results in low magnetic permeability, while conversely, if the quantity of electrically insulating substance added is small, then the insulation resistance is likely to be low.

EXAMPLE 21

First, an aluminum metal powder consisting of grains with a mean particle size of 20 μm was heat-treated in air at a temperature of 400° C. for two hours, thereby forming an oxide film on the surfaces of the powder grains. The thickness of this coating film was estimated from the weight increase which occurred during heat treatment and the results of Auger electron spectroscopy as well as the argon sputtering depth profile, and found to be approximately 10 nm. This powder was molded, sealed into a metal aluminum pipe in a vacuum state, and then subjected to isostatic compression in an atmosphere of argon gas for one hour at a temperature of 600° C. under a pressure of 500 kg/cm$^2$, thereby obtaining primary sintered samples with a relative density of 92%.

These primary sintered samples were then heat-treated in air at 400° C. for two hours. The resulting samples were sealed into metal aluminum pipe in a vacuum state and then subjected to isostatic compression in an atmosphere of argon gas for three hours at a temperature of 600° C. under a pressure of 1000 kg/cm$^2$, thereby obtaining the secondary sintered samples. For purposes of comparison, secondary sintered samples were also prepared under the same conditions from the primary sintered samples obtained as described above, which had not been subjected to the aforesaid additional heat treatment at 400° C.

Next, 2×1×12 mm prismatic test samples were cut from the secondary sintered samples so obtained, following which the density, electrical resistance (using a tester), and thermal conductivity of these test samples were measured. The results of these measurements showed that the density of all these samples was 97%, but the electrical resistance of the samples which had not undergone the additional heat treatment at 400° C. was low, i.e., of the order of 50 ohm, whereas the electrical resistance of the sample which had received the additional heat treatment at 400° C. was 20 megohm or more. The thermal conductivity of these samples was approximately 180 W/m-deg, which is close to that of aluminum.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A composite sintered material with a resistivity of at least 10 ohm-cm comprising:
    a discrete phase including grains made of a first substance, said first substance comprising at least one of a metal and an alloy thereof; and
    a continuous phase including a thin coating film made of a second substance of a dielectric material comprising an inorganic material and formed on the surface of said grains to prepare coated grains, said thin coating film having a mean thickness smaller than the mean particle size of said grains,
    wherein said grains are separated substantially from each other by said thin coating film and the porosity of said composite sintered material is 5% or less, said coated grains being compacted into a green body and said green body being densified in an active gas atmosphere of oxygen, nitrogen or air, and said mean thickness of the thin coating film being from 5 to 50 nanometers, and
    wherein said first substance contains an aluminum metal and said second substance of a dielectric material contains oxides or nitrides of aluminum.

2. A composite sintered material according to claim 1, wherein said first substance is at least one of a magnetic metal and a magnetic metal alloy thereof.

3. A composite sintered material according to claim 1, wherein said second substance of a dielectric material contains at least one member selected from the group consisting of boron, lead, vanadium, and bismuth compounds.

4. A composite sintered material according to claim 1, wherein said first substance is at least one of a metal and an alloy thereof and said second substance of a dielectric material is a material with a substantial electrically insulating nature comprising superplastic ceramics.

5. A composite sintered material according to claim 4, wherein said super-plastic ceramics contain at least one member of the group consisting of apatite and zirconium oxide.

6. A composite sintered material according to claim 1, wherein said grains have a platelet shape.

7. A composite sintered material with a resistivity of at least 10 ohm-cm comprising:
   a discrete phase including grains made of a first substance, said first substance comprising at least one of a metal and an alloy thereof; and
   a continuous phase including a thin coating film made of a second substance of a dielectric material comprising an inorganic material and formed on the surface of said grains to prepare coated grains, said thin coating film having a mean thickness smaller than the mean particle size of said grains,
   wherein said grains are separated substantially from each other by said thin coating film and the porosity of said composite sintered material is 5% or less, said coated grains being compacted into a green body and said green body being densified in an active gas atmosphere of oxygen, nitrogen or air, and said mean thickness of the thin coating film being from 5 to 50 nanometers, and
   wherein said first substance is an iron-based magnetic metal and said second substance of a dielectric material is selected from manganese-zinc ferrite or nickel-zinc ferrite.

8. A composite sintered material with a resistivity of at least 10 ohm-cm comprising:
   a discrete phase including grains made of a first substance, said first substance comprising at least one of metal and an alloy thereof; and
   a continuous phase including a thin coating film made of a second substance of a dielectric material comprising an inorganic material and formed on the surface of said grains to prepare coated grains, said thin coating film having a mean thickness smaller than the mean particle size of said grains,
   wherein said grains are separated substantially from each other by said thin coating film and the porosity of said composite sintered material is 5% or less, said coated grains being compacted into a green body and said green body being densified in an active gas atmosphere of oxygen, nitrogen or air, and said mean thickness of the thin coating film being from 5 to 50 nanometers, and
   wherein said first substance is an iron-based magnetic metal containing aluminum and said second substance of a dielectric material is at least one selected from the group consisting of aluminum oxide, aluminum nitride, and aluminum oxide nitride.

* * * * *

UNITED STATES PATENT AND TRADEMARK OFFICE
CERTIFICATE OF CORRECTION

PATENT NO. : 5,352,522
DATED : October 4, 1994
INVENTOR(S) : Koichi Kugimiya et al.

It is certified that error appears in the above-indentified patent and that said Letters Patent is hereby corrected as shown below:

column 4, line 41, "he" should read --the--.

column 8, line 47, "arm" should read --atm--.

column 10, line 21, "Times That" should read --times that--.

column 10, line 34, "The" should read --the--.

column 23, line 21, "he" should read --the--.

In the Claims:

column 26, line 5, "of metal" should read --of a metal--.

Signed and Sealed this

Fourth Day of April, 1995

*Attest:*

BRUCE LEHMAN

*Attesting Officer*     *Commissioner of Patents and Trademarks*